(12) United States Patent
Xu et al.

(10) Patent No.: US 9,002,291 B2
(45) Date of Patent: Apr. 7, 2015

(54) STANDING WAVE DETECTION METHOD, STANDING WAVE DETECTION APPARATUS AND BASE STATION

(75) Inventors: Shaofeng Xu, Xi'an (CN); Zhengxiang Ma, Bridgewater, NJ (US); Siqing Ye, Shanghai (CN); Wei Wang, Shanghai (CN); Pengfei Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 253 days.

(21) Appl. No.: 13/572,595

(22) Filed: Aug. 10, 2012

(65) Prior Publication Data

US 2012/0309322 A1    Dec. 6, 2012

Related U.S. Application Data

(63) Continuation of application No. PCT/CN2011/070846, filed on Jan. 31, 2011.

(30) Foreign Application Priority Data

Feb. 11, 2010  (CN) .......................... 2010 1 0111622

(51) Int. Cl.
*H04B 17/00* (2006.01)
*H04B 1/04* (2006.01)

(52) U.S. Cl.
CPC .................................. *H04B 1/0466* (2013.01)

(58) Field of Classification Search
USPC ........................................ 455/67.11, 67.14
See application file for complete search history.

(56) References Cited

U.S. PATENT DOCUMENTS

| | | | | |
|---|---|---|---|---|
| 5,083,086 | A | * | 1/1992 | Steiner .......................... 324/533 |
| 5,913,154 | A | * | 6/1999 | Wynn .......................... 455/127.2 |
| 6,798,211 | B1 | * | 9/2004 | Rockwell et al. .............. 324/527 |
| 2003/0087605 | A1 | | 5/2003 | Das et al. |
| 2004/0073395 | A1 | * | 4/2004 | Furse et al. ................... 702/108 |
| 2006/0097730 | A1 | * | 5/2006 | Park et al. ..................... 324/534 |
| 2007/0108989 | A1 | | 5/2007 | Shi et al. |
| 2008/0186140 | A1 | * | 8/2008 | Kuwako et al. .............. 340/10.1 |

(Continued)

FOREIGN PATENT DOCUMENTS

| | | |
|---|---|---|
| CN | 1666109 A | 9/2005 |
| CN | 1863244 A | 11/2006 |
| CN | 1925348 A | 3/2007 |

(Continued)

OTHER PUBLICATIONS

International Search Report received in Patent Cooperation Treaty Application No. PCT/CN2011/070846, mailed May 5, 2011, 4 pages.

(Continued)

*Primary Examiner* — Yuwen Pan
*Assistant Examiner* — Ayodeji Ayotunde
(74) *Attorney, Agent, or Firm* — Slater & Matsil, L.L.P.

(57) ABSTRACT

A standing wave detection method, a standing wave detection apparatus, and a base station are disclosed. The method includes collecting, a feedback signal from a feedback path of a base station which uses a baseband multi-tone signal as a transmission signal; performing calibration on the feedback signal by using stored calibration data to obtain a reflected signal in the feedback signal; and obtaining a standing wave detection value according to the transmission signal and the reflected signal that is in the feedback signal.

12 Claims, 6 Drawing Sheets

(56) References Cited

U.S. PATENT DOCUMENTS

2009/0102740 A1* 4/2009 Rofougaran .................. 343/860
2009/0253385 A1* 10/2009 Dent et al. ...................... 455/83

FOREIGN PATENT DOCUMENTS

| CN | 101146314 A | 3/2008 |
| CN | 101557601 A | 10/2009 |
| CN | 101958756 A | 1/2011 |

OTHER PUBLICATIONS

Written Opnion of the International Searching Authority received in Patent Cooperation Treaty Application No. PCT/CN2011/070846, mailed May 5, 2011, 4 pages.

* cited by examiner

STANDING WAVE DETECTION METHOD, STANDING WAVE DETECTION APPARATUS AND BASE STATION

CROSS-REFERENCE TO RELATED APPLICATIONS

This application is a continuation of International Application No. PCT/CN2011/070846, filed Jan. 31, 2011, which claims priority to Chinese Patent Application No. 201010111622.3, filed Feb. 11, 2010, both of which applications are incorporated herein by reference.

TECHNICAL FIELD

The present invention relates to the field of wireless communication technologies, and in particular, to a standing wave detection method, a standing wave detection apparatus, and a base station.

BACKGROUND

In the field of wireless communication technologies, for a wireless communication product such as a base station and so on, product quality needs to be inspected through standing wave detection to ensure signal quality in a communication process.

Figure 1:
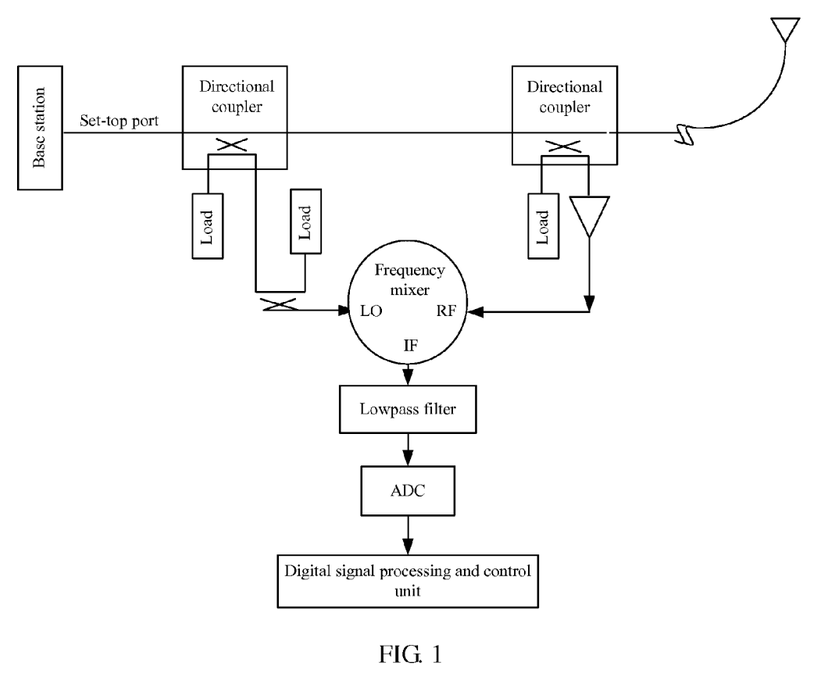
FIG. 1 is a schematic diagram of using a PDFDR method to perform standing wave detection in the prior art.

In the prior art, the standing wave detection is implemented through a frequency domain reflectometry (FDR) method or a phase-detection frequency-domain reflectometry (PDFDR) method. The FDR is also referred to as a frequency sweeping reflectometry, and is configured to send a continuous stepped sine wave, receive a stepped continuous wave reflected by discontinuous points after discontinuous reflection via a transmission cable, and performs processing and analysis by detecting a difference between a transmission signal and a feedback signal, to obtain a standing wave ratio and fault location information. FIG. 1 is a schematic diagram of a PDFDR method. As shown in FIG. 1, the base station sends a frequency sweep signal, distinguishes an incident wave from a reflected wave through a directional coupler, and compares a difference (equivalent to a delay) between the incident wave and the reflected wave. An obtained simulated voltage sequence undergoes inverse fast Fourier transform (IFFT), and a location of a reflection point and strength of the feedback signal are obtained, that is, a connection state and a fault state of an antenna feeder cable are obtained.

In the prior art, an additional hardware circuit such as a coupler, a load, a frequency mixer, an operation amplifier, an analog-to-digital converter (ADC) and so on need to be added to the standing wave detection, which leads to a complicated link and a high cost.

SUMMARY OF THE INVENTION

Embodiments of the present invention put forward a standing wave detection method, a standing wave detection apparatus, and a base station.

An embodiment of the present invention provides a standing wave detection method, including: collecting, a feedback signal from a feedback path of a base station which uses a baseband multi-tone signal as a transmission signal; performing calibration processing on the feedback signal by using stored calibration data to obtain a reflected signal in the feedback signal, where the calibration data is baseband multi-tone signals and corresponding feedback signals collected when a calibration point is in a state of open-circuited, short-circuited, or matched load, respectively; and obtaining a standing wave detection value according to the transmission signal and the reflected signal that is in the feedback signal.

An embodiment of the present invention further provides a standing wave detection apparatus, including: a collecting module, configured to collect a feedback signal from a feedback path of a base station which uses a baseband multi-tone signal as a transmission signal; a calibrating module, configured to perform calibration processing on the feedback signal by using stored calibration data to obtain a reflected signal in the feedback signal, where the calibration data is baseband multi-tone signals and corresponding feedback signals collected when a calibration point is in a state of open-circuited, short-circuited, or matched load, respectively; and a detecting module, configured to obtain a standing wave detection value according to the transmission signal and the reflected signal that is in the feedback signal.

An embodiment of the present invention further provides a base station, including the foregoing standing wave detection apparatus.

The technical solutions provided in the foregoing embodiments use the baseband multi-tone signal as a transmission signal for testing, namely, a baseband signal, receive the feedback signal through the feedback path, and use the transmission signal and the feedback signal to obtain a time domain system transmission function, thereby implementing the standing wave detection, where there is only a need to increase a small amount of calculation and no need to increase a hardware cost, and making the standing wave detection easier. Further, the stored calibration data is used to perform the calibration processing on the feedback signal to obtain the reflected signal in the feedback signal, a problem of bringing an error to the standing wave detection by mingled signal leaked by a coupler into the feedback signal is excluded, and precision of the standing wave detection is improved.

DETAILED DESCRIPTION OF ILLUSTRATIVE EMBODIMENTS

The technical solutions of the present invention are further described in detail below with reference to accompanying drawings and embodiments.

Figure 2:
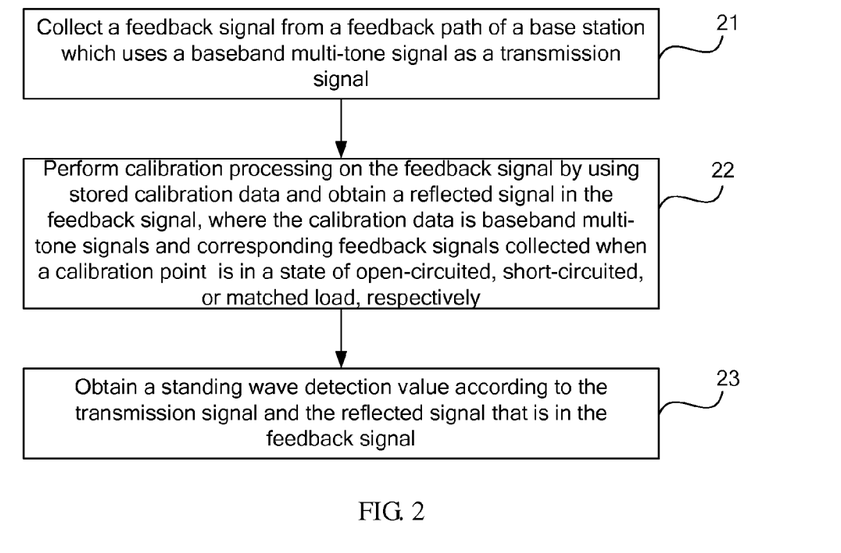
FIG. 2 is a flowchart of a standing wave detection method according to an embodiment of the present invention.

FIG. 2 is a flowchart of a standing wave detection method according to an embodiment of the present invention. The method includes:

Step 21: Collect a feedback signal from a feedback path of a base station which uses a baseband multi-tone signal as a transmission signal. The transmission signal is a signal transmitted by the base station. To perform standing wave detection, a baseband signal whose signal is a baseband multi-tone signal, that is, whose signal is a multi-tone signal, may be generated, and is transmitted by the base station. The base station converts the baseband multi-tone signal into a radio frequency. That is, a baseband multi-tone signal source is selected as a signal source sent by the base station in place of a frequency sweep signal source of a traditional FDR. A form of the baseband multi-tone signal may not be limited. That is, a parameter such as a frequency interval and the number of frequencies may completely depend on an actual system capability and a requirement on detection precision.

Step 22: Perform calibration processing on the feedback signal by using stored calibration data and obtain a reflected signal in the feedback signal, where the calibration data is baseband multi-tone signals and corresponding feedback signals collected when a calibration point is in a state of open-circuited, short-circuited, or matched load, respectively.

Step 23: Obtain a standing wave detection value according to the transmission signal and the reflected signal that is in the feedback signal. A concept of the standing wave detection value may include a standing wave ratio, and may further include a fault point location. Specifically, this step at least may include one of the following operations:

Operation 1: Obtain a rectified time domain system transmission function h(t) by using the transmission signal and the reflected signal; obtain a peak value of the reflected signal through an h(t) curve; obtain a location of the transmit point, that is, obtain a location of the cable fault point such as a breakpoint, by using the peak value and a cable fault point calculation formula $$L = \left(\frac{\text{Peak}-1}{N_{FFT}-1}\right)\left(\frac{N_F-1}{f_1-f_2}\right) v_p,$$

where Peak is a peak value of the reflected signal, where the value is obtained through the h(t) curve; $f_1$ is a start frequency point of frequency sweeping; $f_2$ is an end frequency point of the frequency sweeping, $N_F$ is the number of frequency sweeping points; $N_{FFT}$ is the number of points in FFT transform; and $V_p$ is propagation velocity in a cable, where the speed is close to velocity of light.

Operation 2: Average amplitude of the feedback signals collected in states that the calibration point is open-circuited and short-circuit, to obtain a maximum value of the feedback signals; compare the reflected signal in the feedback signal with the maximum value of the feedback signal to obtain a reflectance; and use the reflectance and the standing wave ratio calculation formula to obtain the standing wave ratio.

The technical solution provided in this embodiment uses the baseband multi-tone signal as a transmission signal for testing, namely, a baseband signal, receives the feedback signal through the feedback path, and uses the transmission signal and the feedback signal to obtain the time domain system transmission function, thereby implementing the standing wave detection, where there is only a need to increase only a small amount of calculation and no need to increase a hardware cost, and making the standing wave detection easier. For example, a hardware circuit such as a coupler load, a frequency mixer, an operation amplifier, and an analog-to-digital converter are saved. Further, the stored calibration data is used to perform calibration processing on the feedback signal to obtain the reflected signal, a problem of bringing an error to the standing wave detection by mingled signal leaked by a coupler into the feedback signal is excluded, and precision of the standing wave detection is improved.

Figure 3:
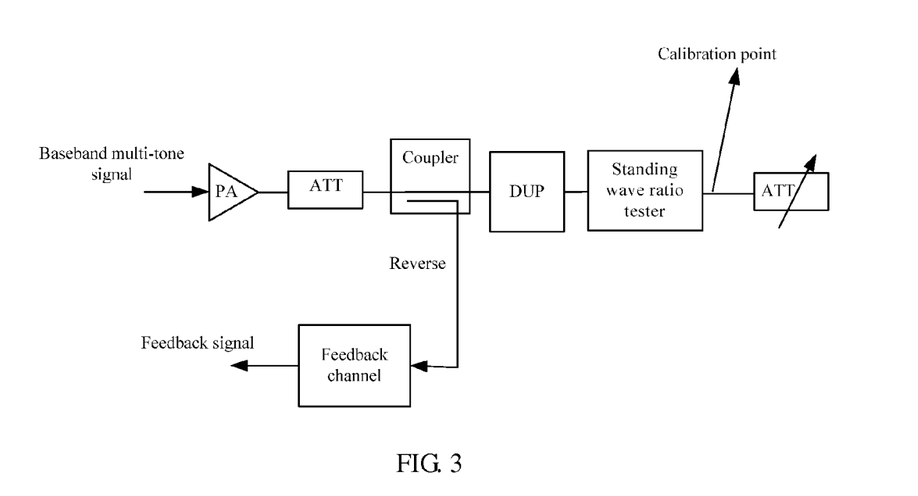
FIG. 3 is a schematic diagram of a to-be-tested base station, where the base station is applied in a standing wave detection method, according to an embodiment of the present invention.

FIG. 3 is a schematic diagram of a to-be-tested base station, where the base station is applied in a standing wave detection method according to an embodiment of the present invention. The to-be-tested base station shown in FIG. 3 is taken as an example for illustration. A baseband multi-tone signal x(t) passes through a power amplifier (PA) and a 10 decibel (dB) attenuator (Attenuator, ATT) connected after it, a 20 dB coupler (Coupler), a duplexer (DUP), a standing wave ratio tester, a calibration point, to an adjustable attenuator. A reflected signal is reversed from the coupler to a feedback path, and the feedback path outputs a feedback signal y(t). In the DUP, only a filter of processing a transmission signal is used. The 10 decibel attenuator is connected after the power amplifier (PA) in order to prevent damage to a calibration component (namely, an instrument or device with an open circuit key, a short circuit key, and a matched load) at the calibration point. Because the amplifier outputs a signal of about 30 dBm as a minimum, 10 dB attenuation is added to protect the calibration component. The attenuator does not affect a test result, and therefore does not need to be replaced in a test process. A standing wave at a test point may be changed by adjusting the adjustable attenuator after the standing wave ratio tester, and the standing wave ratio tester may accurately measure an actual standing wave ratio at the test point. By comparing a standing wave ratio obtained through the technical solution provided in this embodiment with the actual standing wave ratio measured by the standing wave ratio tester, accuracy of standing wave ratio detection in the embodiments of the present invention may be verified.

Figure 4:
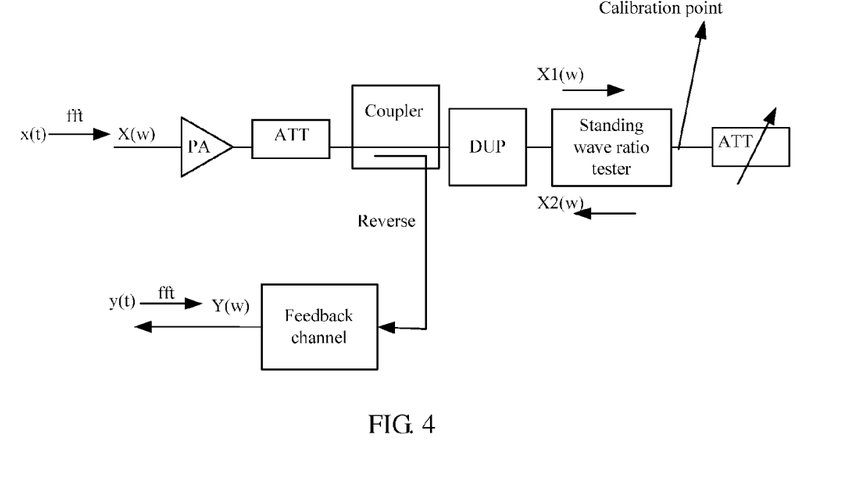
FIG. 4 is a schematic diagram of data analysis of the base station shown in FIG. 3.

FIG. 4 is a schematic diagram of data analysis of the base station shown in FIG. 3. x(t) is the baseband multi-tone signal sent by the base station, y(t) is the feedback signal received through the feedback path, X(w) is a frequency domain signal obtained through FFT transform from x(t), Y(w) is a frequency domain signal obtained through the FFT transform from the feedback signal y(t), H(w) is a frequency domain system transmission function in a finite bandwidth, X1(w) is a forward signal at a duplexer egress, namely, X(w), and X2(w) is a reflected signal at the duplexer egress. To obtain a high-precision reflectance, only the reflected signal X2(w) needs to be precisely obtained. However, in an actual system, signal leakage exists at the coupler. Therefore, an error exists between Y(w) obtained by calculating y(t) collected through the feedback path and X2(w). That is, the two signals X1(w) and X2(w) are mingled with Y(w), which makes it hard to obtain X2(w) precisely. This embodiment primarily performs calibration processing of calibrating the data Y(w) and X(w) to obtain X2(w), so as to implement high-precision standing wave detection.

A actual calculation process of the standing wave detection of the base station includes the following steps:

Step 1: Send data x3(t), x4(t), and x5(t) in a state that a calibration point is open-circuited, short-circuited, and under a matched load, respectively. Accordingly, collect feedback data y3(t), y4(t), and y5(t) on the feedback path. Perform the fast Fourier transform (FFT) on x3(t), x4(t), x5(t), y3(t), y4(t), and y5(t), respectively, to obtain X3(w), X4(w), X5(w), Y3(w), Y4(w), and Y5(w), respectively. Apply a formula H(w)=Y(w)/X(w) to (X3(w), Y3(w)), (X4(w), Y4(w)), and (X5(w), Y5(w)), respectively, to obtain frequency domain system transmission functions H3(w), H4(w), and H5(w) from a sender to a feedback receiver. Perform inverse fast Fourier transform (IFFT) on the frequency domain system transmission functions H3(w), H4(w), and H5(w), respectively, to obtain time domain system transmission functions h3(t), h4(t), and h5(t).

Step 2: When the calibration component is removed from the calibration point, send the baseband multi-tone signal x(t), and collect the feedback signal y(t) through the feedback path; perform the FFT transform on x(t) and y(t), respectively, to obtain X(w) and Y(w). Perform digital phase discrimination on X(w) and Y(w) to obtain the frequency domain system transmission function H(w); and perform the IFFT transform on H(w) to obtain a time domain system transmission function h(t).

Step 3: Use h3(t) and h4(t) curves obtained in a state when the calibration point is open-circuited and short-circuited, respectively, to obtain amplitude of the feedback signals y3(t) and y4(t), respectively, average the two values, and use the average value as a maximum value of the reflected signals of x3(t) and x4(t). Because the amplitudes of y3(t) and y4(t) are very close and even coincides, the averaging may not be performed, and maximum peak values of y3(t) and y4(t) are used as the maximum values of the reflected signals of x3(t) and x4(t). The precise reflected signal obtained in the foregoing is compared with the maximum reflection value to obtain the reflectance, and then obtain a very precise standing wave size.

Step 4: Use Y3(w), Y4(w), and Y5(w) to rectify h(t) obtained in the foregoing step 2, that is, perform phase adjustment, to eliminate an influence by front-end transmitting of the circulator (or coupler) and the duplexer. That is, eliminate data that interferes X2(w) to rectify the error and obtain the precise reflected signal X2(w). Specifically, perform a relevant operation on Y3(w), Y4(w), Y5(w), and Y(w) to obtain the reflected signal X2(w). Further, use a ratio of X2(w) and X(w) to obtain rectified H(w), and perform the IFFT transform on rectified H(w) to obtain rectified h(t). Use the rectified h(t) curve to obtain a precise peak value of the reflected signal, substitute it into a cable fault point calculation formula $$L = \left(\frac{\text{Peak} - 1}{N_{FFT} - 1}\right)\left(\frac{N_F - 1}{f_1 - f_2}\right) v_p$$

to obtain a precise location of a cable fault point.

A farthest location of the cable fault point, where the location is detectable by using the foregoing formula, is $L_{max} = V_p/4Df$; and resolution of cable length is the error $DL = V_p/(2N_{FFT}Df)$.

Step 5: Compare the precise reflected signal X2(w) obtained in the foregoing step 4 with the maximum value of the reflected signal obtained in the foregoing step 3 to obtain the reflectance, and then obtain the standing wave ratio.

In the technical solution provided in this embodiment, calibration data is used to rectify the error generated by the circulator or coupler because of isolation, and obtain the very precise standing wave value. If the fault point exists on the cable, the location of the cable fault point can be obtained precisely.

In an ideal hardware link environment, in a scenario where states of transmit data, collected feedback data, link clock synchronization and so on are ideal, and directivity of the coupler or circulator is greater than 30 dB, the technical solution provided in the foregoing embodiment of the present invention may be used to implement high-precision standing wave detection and cable fault locating by using the digital phase discrimination performed completely on a baseband. Emulation data is as shown in Table 1.

TABLE 1

| | Circulator isolation 15 dB | | |
|---|---|---|---|
| Ideal standing wave ratio | Reflectance obtained through calibration in an emulation environment by using the open circuit key and the short circuit key according to the foregoing embodiment of the present invention | Standing wave ratio obtained in an emulation environment by using the technical solution of the foregoing embodiment of the present invention | Standing wave ratio error |
| 9.995 | 0.818132406 | 9.997011357 | −0.002011357 |
| 5 | 0.666702902 | 5.000652316 | −0.000652316 |
| 2.5 | 0.42852484 | 2.499714666 | 0.000285334 |
| 1.667 | 0.250027177 | 1.666763299 | 0.000236701 |
| 1.25 | 0.111099033 | 1.249969426 | 3.05736E−05 |
| 1.1 | 0.047613871 | 1.099988586 | 1.14142E−05 |

Figure 5:
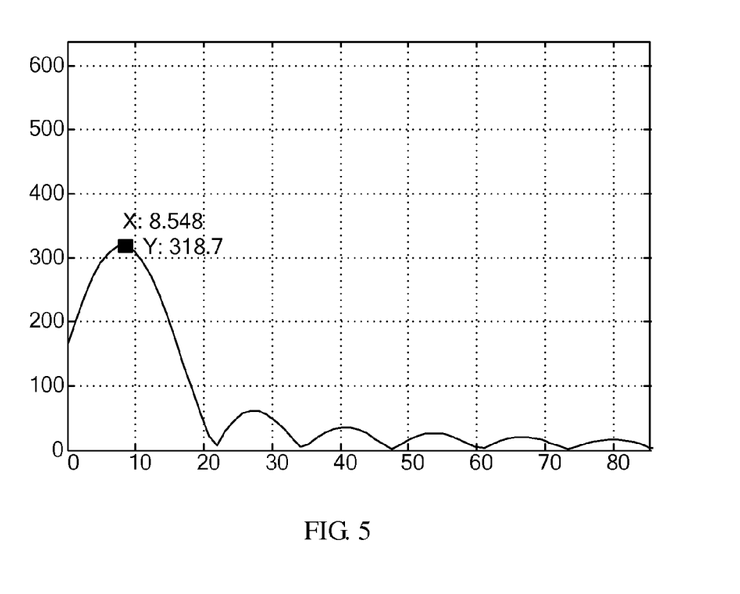
FIG. 5 is a schematic diagram of a breakpoint location obtained by actually measuring an open circuit by using the prior art in a state that isolation of a circulator is 15 dB.
Figure 6:
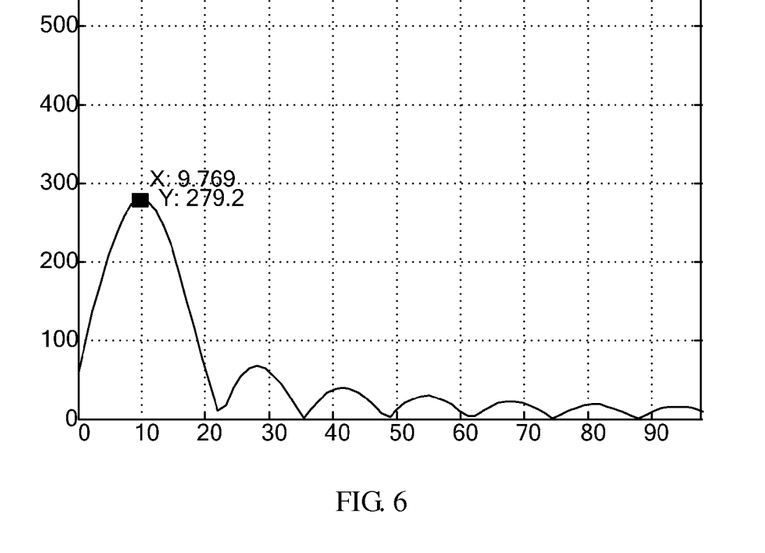
FIG. 6 is a schematic diagram of a breakpoint location obtained by actually measuring a short circuit by using the prior art in the state where the isolation of the circulator is 15 dB.
Figure 7:
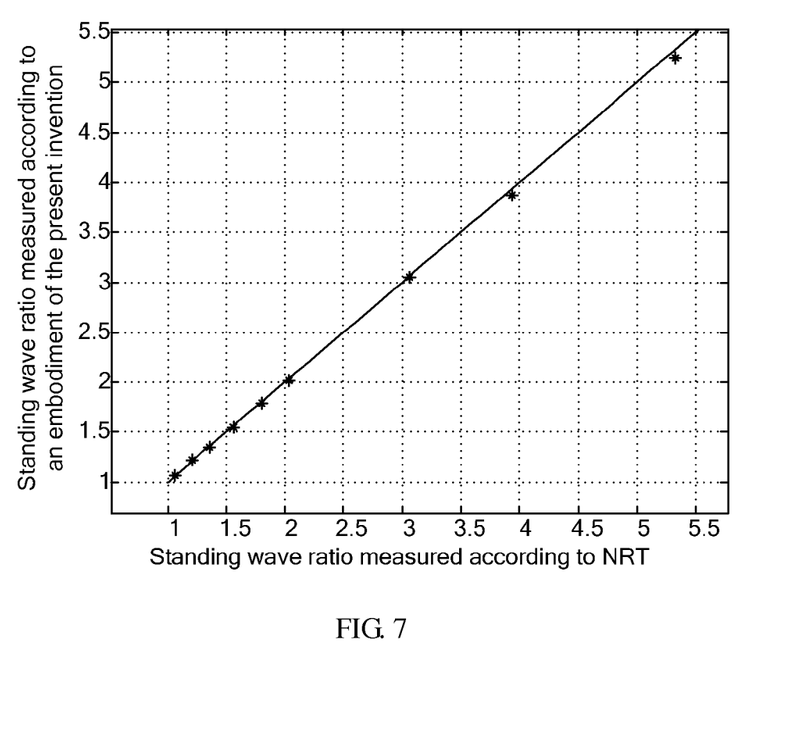
FIG. 7 is a schematic diagram of standing wave ratio precision obtained in an emulation environment by using a standing wave detection method according to an embodiment of the present invention.
Figure 8:
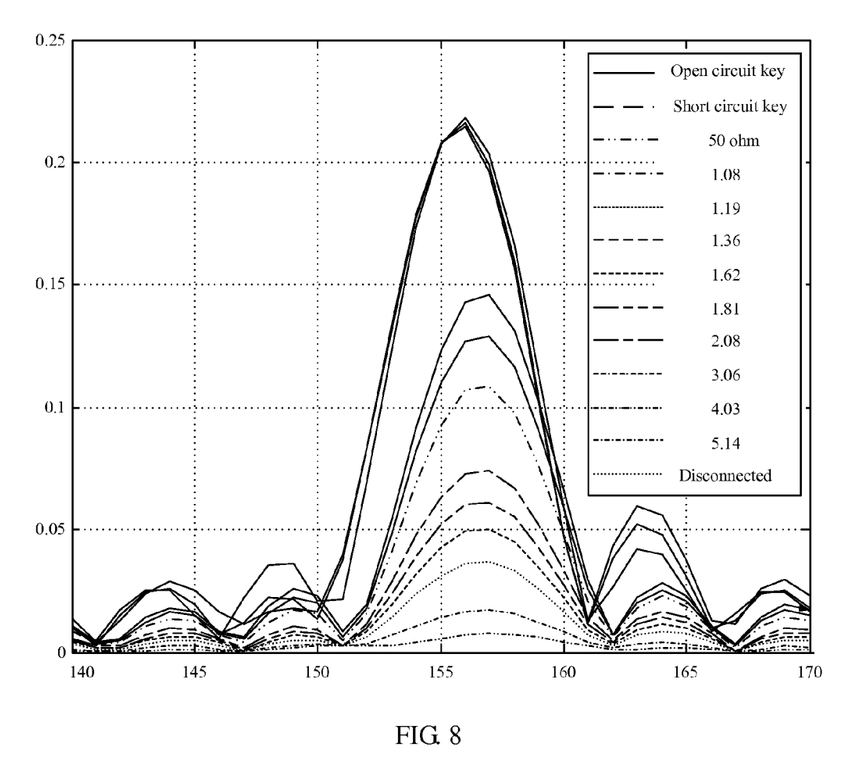
FIG. 8 is a schematic diagram of fault point location precision obtained in the emulation environment by using the standing wave detection method according to the embodiment of the present invention.

An ideal environment system highly requires real time, and needs to perform real-time rectification and test. Therefore, when the standing wave detection is performed on an actual system by using the prior art, ideal data can only be obtained with a very high requirement on hardware and synchronization. Otherwise, detection results are as shown in FIG. 5 and FIG. 6. FIG. 5 is a schematic diagram of a breakpoint location obtained by actually measuring an open circuit by using the prior art in a state that the isolation of the circulator is 15 dB; and FIG. 6 is a schematic diagram of a breakpoint location obtained by actually measuring a short circuit by using the prior art in the state where the isolation of the circulator is 15 dB. It may be seen that, without rectification of the actual system, an error of an obtained breakpoint location is great. By using the technical solution provided in this embodiment of the present invention, such restrictions may be cancelled completely. That is, time synchronization of data collection is not required, good directivity of a hardware coupler or circulator is not required, and real time of data calculation is not required either. That is, in the foregoing embodiment, the matched load, the open circuit key, and the short circuit key are used to store the calibration data X(w) and Y(w), respectively. In an actual system test, it is only needed to retrieve the stored calibration data X(w) and Y(w) anytime to perform compensation and rectification of a phase, collection time, and synchronization, on the data collected in real time, which implements high-precision calculation and obtains the high-precision reflectance. With the obtained accurate reflectance and a known cable feature, the cable fault point and the standing wave ratio may be obtained. After the compensation is performed according to the foregoing embodiment of the present invention, the obtained standing wave ratio is precise. As shown in FIG. 7, * represents the standing wave ratio obtained after the compensation, and the oblique line represents the ideal data, that is, the standing wave ratio detected by the standing wave ratio tester. The more the * coincides with the oblique line, the higher the precision is. By using the technical solution provided in the foregoing embodiment of the present invention, the standing wave ratio error can be controlled under 0.05. It may be seen in FIG. 7, the standing wave ratio obtained after the compensation according to the foregoing embodiment of the present invention is very close to the standing wave ratio measured by the standing wave ratio tester. In this way, an accurate standing wave ratio can be measured without using a standing wave ratio tester when the standing wave detection is performed. FIG. 8 shows precision of a fault location obtained by detection in the emulation environment according the foregoing method embodiment, where in FIG. 8, the h(t) curves includes h(t) curves in a state that the calibration point is open-circuited, short-circuited, and under a matched load of 50 ohm, respectively, and h(t) curves when the standing wave ratio is 1.08, 1.19, 1.36, 1.62, 1.81, 2.08, 3.06, 4.03, and 5.14, respectively. The maximum peak value of the h(t) curve is the cable fault location. It may be seen in FIG. 8, precision of the test result of the standing wave detection is high.

Figure 9:
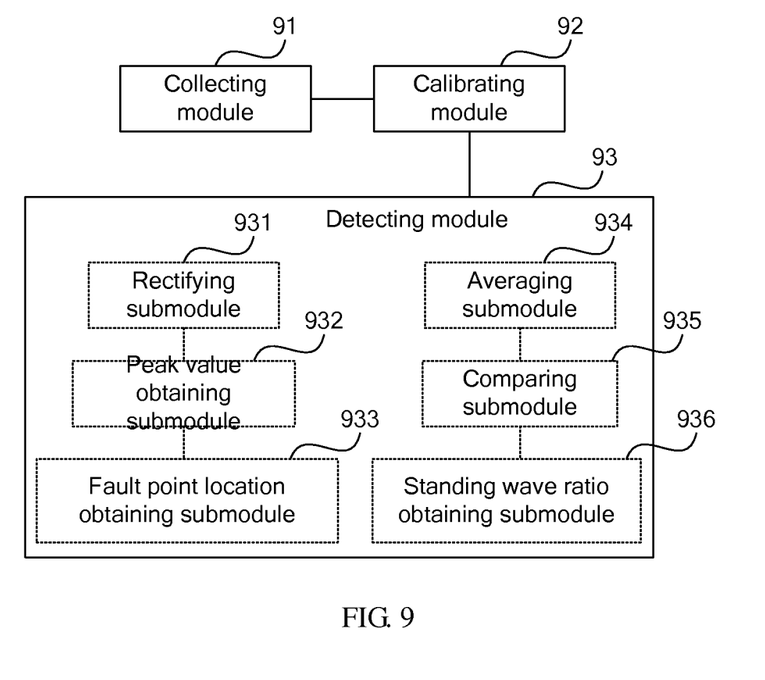
FIG. 9 is a schematic structural diagram of a standing wave detection apparatus according to an embodiment of the present invention.

FIG. 9 is a schematic structural diagram of a standing wave detection apparatus according to an embodiment of the present invention. The apparatus includes: a collecting module 91, a calibrating module 92, and a detecting module 93. The collecting module 91 is configured to collect, a feedback signal from a feedback path of a base station, which uses a baseband multi-tone signal as a transmission signal. Reference may be made to the illustration of the foregoing step 21 for a specific operation. The calibrating module 92 is configured to perform calibration processing on the feedback signal by using stored calibration data to obtain a reflected signal in the feedback signal, where the calibration data is baseband multi-tone signals and corresponding feedback signals collected when a calibration point is in a state of open-circuited, short-circuited, or matched load, respectively. Reference may be made to the illustration of the foregoing step 22 for a specific operation. The detecting module 93 is configured to obtain a standing wave detection value according to the transmission signal and the reflected signal that is in the feedback signal. For detailed operations, reference may be made to the illustration of the foregoing step 23 for a specific operation.

The detecting module 93 may include: a rectifying submodule 931, a peak value obtaining submodule 932, and a fault point location obtaining submodule 933. The rectifying submodule 931 is configured to obtain a rectified time domain system transmission function according to the transmission signal and the reflected signal; the peak value obtaining submodule 932 is configured to obtain a peak value of the reflected signal according to a curve of the time domain system transmission function; the fault point location obtaining submodule 933 is configured to obtain a location of a cable fault point by using the peak value and a cable fault calculation formula.

The detecting module 93 may separately or further include: an averaging submodule 934, a comparing submodule 935, and a standing wave ratio obtaining submodule 936. The averaging submodule 934 is configured to obtain a maximum value of the feedback signals through averaging amplitude of feedback signals collected when the calibration point is in the state of open-circuited or short-circuited, respectively. The comparing submodule 935 is configured to compare the reflected signal in the feedback signal with the maximum value of the feedback signal to obtain a reflectance. The standing wave ratio obtaining submodule 936 is configured to obtain a standing wave ratio according to the reflectance to. The foregoing standing wave detection apparatus may also be an instrument.

In this embodiment, the standing wave detection apparatus uses the baseband multi-tone signal as the transmission signal for testing, that is, a baseband signal, receives the feedback signal through the feedback path, and uses the transmission signal and the feedback signal to obtain the time domain system transmission function, thereby implementing standing wave detection, where there is only a need to increase a small amount of calculation and no need to increase a hardware cost, and making the standing wave detection easier. Further, the stored calibration data is used to perform calibration processing on the feedback signal to obtain the reflected signal, a problem of bringing an error to the standing wave detection by mingled signal leaked by a coupler into the feedback signal is excluded, and precision of the standing wave detection is improved.

Figure 10:
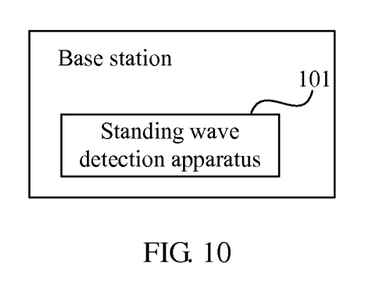
FIG. 10 is a schematic structural diagram of a base station according to an embodiment of the present invention.

FIG. 10 is a schematic structural diagram of a base station according to an embodiment of the present invention. The base station includes a standing wave detection apparatus 101. The standing wave detection apparatus 101 is configured to perform standing wave detection on the base station. The standing wave detection apparatus 101 may be any standing wave detection apparatus provided in the foregoing apparatus embodiment.

In this embodiment, the base station adopts a standing wave detection apparatus, uses a baseband multi-tone signal as a transmission signal for testing, receives a feedback signal through a feedback path, and uses the transmission signal and the feedback signal to obtain a time domain system transmission function, thereby implementing the standing wave detection, where there is only a need to increase a small amount of calculation and no need to increase a hardware cost, and making the standing wave detection easier. Further, the stored calibration data is used to perform calibration processing on the feedback signal to obtain the reflected signal, a problem of bringing an error to the standing wave detection by mingled signal leaked by a coupler into the feedback signal is excluded, and precision of the standing wave detection is improved.

In the technical solution provided in the foregoing embodiments, the reflected signal of the baseband multi-tone signal is collected through an existing feedback path of the base station, and is calculated with the baseband multi-tone signal to obtain a standing wave detection result. That is, the high-precision standing wave detection and the breakpoint locating of the cable at an antenna port are implemented. For many existing wireless products, such functions may be implemented through software update, and there is no need to add a hardware circuit, which reduces a cost of standing wave detection. Moreover, personnel engaged in maintenance and inspection may implement the standing wave detection without a need to carry a heavy and expensive instrument or take apart a cable connector, which makes it easier to implement the standing wave detection. Moreover, the calibration is performed with the open circuit key, the short circuit key, and the matched load. Through the calibration with the open circuit key and the short circuit key, a maximum reflected value is found, and a normalized reflectance is obtained; through the calibration with the matched load, high-precision calibration and compensation are implemented, and the error brought by the directivity of the circulator and the directional coupler can be reduced. Data sent after the calibration undergoes the FFT transform, and data received from the feedback path also undergoes the FFT transform. Through calculation of a function in a frequency domain, the frequency domain transmission function of the system may be obtained. Time of the data collection not need to be aligned strictly, which reduces a requirement of the system on simultaneous collection of data. With the frequency domain transmission function of the system, the time domain transmission function of the system may be obtained by performing the IFFT transform, thereby obtaining a state of the breakpoints at the antenna port and on an external cable. The calibration data and actual test data are exactly processed in the same way in a digital domain. The calibration data is pre-stored as a reference for the actual test data. The calibration data does not highly require the real time. Performing production calibration once is enough, data may be collected and calculated anytime subsequently to implement detection, without being affected by the environment. Moreover, the calibration and the test are performed under the same output power. Once the calibration of the open circuit, short circuit, and the matched load are implemented under specific power, the calibration data may be invoked to implement the high-precision standing wave detection and locating of cable faults anytime.

Persons of ordinary skill in the art may understand that, all or part of the steps of the foregoing method embodiments may be implemented by a program instructing relevant hardware. The program may be stored in a computer readable storage medium. When the program is executed, it executes the steps including the foregoing method embodiment. The storage medium includes various media that may store program codes, such as a ROM, a RAM, a magnetic disk, or a compact disk and so on.

Finally, it should be noted that: The foregoing embodiments are merely intended to illustrate the technical solutions of the present invention, but not to limit it. Although the present invention is illustrated in detail with reference to the foregoing embodiments, persons of ordinary skill in the art should understand that they may still make modifications or equivalent replacements to the technical solutions provided in each foregoing embodiment, and these modifications or replacements do not make the nature of corresponding technical solutions depart from the spirit and scope of the technical solutions provided in each embodiment of the present invention.

What is claimed is:

1. A standing wave detection method, comprising:
    collecting a feedback signal from a feedback path of a base station that uses a baseband multi-tone signal as a transmission signal;
    performing calibration processing on the feedback signal by using stored calibration data to obtain a reflected signal in the feedback signal, wherein the stored calibration data includes baseband multi-tone signals and corresponding feedback signals respectively collected when a calibration point is in a state of open-circuited, short-circuited, and matched load; and
    obtaining a standing wave detection value according to the transmission signal and the reflected signal that is in the feedback signal.

2. The standing wave detection method according to claim 1, wherein obtaining the standing wave detection value comprises:
    obtaining a rectified time domain system transmission function according to the transmission signal and the reflected signal;
    obtaining a peak value of the reflected signal according to a curve of the time domain system transmission function; and
    obtaining a location of a cable fault point according to the peak value.

3. The standing wave detection method according to claim 1, wherein obtaining the standing wave detection value comprises:
    obtaining a maximum value of the feedback signal through averaging amplitude of the corresponding feedback signals;
    comparing the reflected signal in the feedback signal with the maximum value of the feedback signal to obtain a reflectance; and
    obtaining a standing wave ratio according to the reflectance.

4. The standing wave detection method according to claim 2, wherein the obtaining the location of a cable fault point according to the peak value comprises:
    obtaining the location of the cable fault point according the peak value and a cable fault point calculation formula $$L = \left(\frac{\text{Peak}-1}{N_{FFT}-1}\right)\left(\frac{N_F-1}{f_1-f_2}\right)v_p;$$

where Peak is the peak value of the reflected signal, $f_1$ is a start frequency point of frequency sweeping, $f_2$ is an end frequency point of the frequency sweeping, $N_F$ is a number of frequency sweeping points; $N_{FFT}$ is a number of points in FFT transform; and $V_p$ is a propagation velocity in a cable, wherein the propagation velocity has a speed close to a speed of light.

5. A standing wave detection apparatus, comprising:
    a collecting module, configured to collect a feedback signal from a feedback path of a base station that uses a baseband multi-tone signal as a transmission signal;
    a calibrating module, configured to perform calibration processing on the feedback signal by using stored calibration data to obtain a reflected signal in the feedback signal, wherein the stored calibration data comprises baseband multi-tone signals and corresponding feedback signals respectively collected when a calibration point is in a state of open-circuited, short-circuited, and matched load; and
    a detecting module, configured to obtain a standing wave detection value according to the transmission signal and the reflected signal that is in the feedback signal.

6. The standing wave detection apparatus according to claim 5, wherein the detecting module comprises:
    a rectifying submodule configured to obtain a rectified time domain system transmission function according to the transmission signal and the reflected signal;
    a peak value obtaining submodule configured to obtain a peak value of the reflected signal according to a curve of the time domain system transmission function; and
    a fault point location obtaining submodule configured to obtain a location of a cable fault according to the peak value.

7. The standing wave detection apparatus according to claim 5, wherein the detecting module comprises:
    an averaging submodule configured to obtain a maximum value of the feedback signal through averaging amplitude of the corresponding feedback signals;
    a comparing submodule configured to compare the reflected signal in the feedback signal with the maximum value of the feedback signal to obtain a reflectance; and
    a standing wave ratio obtaining submodule configured to obtain a standing wave ratio according to the reflectance.

8. The standing wave detection apparatus according to claim 5, wherein the standing wave detection apparatus comprises an instrument.

9. A computer program product comprising a computer readable non-transitory storage medium storing program code thereon for use by a base station, the program code comprising:
  instructions for collecting a feedback signal from a feedback path of a base station that uses a baseband multi-tone signal as a transmission signal;
  instructions for performing calibration processing on the feedback signal by using stored calibration data to obtain a reflected signal in the feedback signal, wherein the stored calibration data includes baseband multi-tone signals and corresponding feedback signals respectively collected when a calibration point is in a state of open-circuited, short-circuited, and matched load; and
  instructions for obtaining a standing wave detection value according to the transmission signal and the reflected signal that is in the feedback signal.

10. The computer program product according to claim 9, wherein the instructions for obtaining the standing wave detection value according to the transmission signal and the reflected signal that is in the feedback signal comprise:
  instructions for obtaining a rectified time domain system transmission function according to the transmission signal and the reflected signal;
  instructions for obtaining a peak value of the reflected signal according to a curve of the time domain system transmission function; and
  instructions for obtaining a location of a cable fault point according to the peak value.

11. The computer program product according to claim 9, wherein the instructions for obtaining the standing wave detection value according to the transmission signal and the reflected signal that is in the feedback signal comprise:
  instructions for obtaining a maximum value of the feedback signal through averaging amplitude of the corresponding feedback signals;
  instructions for comparing the reflected signal in the feedback signal with the maximum value of the feedback signal to obtain a reflectance; and
  instructions for obtaining a standing wave ratio according to the reflectance.

12. The computer program product according to claim 10, wherein the instructions for obtaining a location of a cable fault point according to the peak comprise:
  instructions for obtaining the location of the cable fault point according the peak value and a cable fault point calculation formula $$L = \left(\frac{\text{Peak} - 1}{N_{FFT} - 1}\right)\left(\frac{N_F - 1}{f_1 - f_2}\right) v_p;$$

where Peak is the peak value of the reflected signal, $f_1$ is a start frequency point of frequency sweeping, $f_2$ is an end frequency point of the frequency sweeping, $N_F$ is a number of frequency sweeping points; $N_{FFT}$ is a number of points in FFT transform; and $V_p$ is a propagation velocity in a cable, wherein the propagation velocity has a speed close to a speed of light.

* * * * *